US012590379B2

(12) United States Patent
Scheiff et al.

(10) Patent No.: US 12,590,379 B2
(45) Date of Patent: Mar. 31, 2026

(54) INTEGRATED PROCESS OF PYROLYSIS, ELECTRODE ANODE PRODUCTION AND ALUMINUM PRODUCTION AND JOINT PLANT

(71) Applicants: BASF SE, Ludwigshafen am Rhein (DE); thyssenkrupp AG, Essen (DE); thyssenkrupp Uhde GmbH, Dortmund (DE)

(72) Inventors: Frederik Scheiff, Ludwigshafen (DE); Marc Leduc, Ludwigshafen (DE); Grigorios Kolios, Ludwigshafen (DE); William Daloz, Beachwood, OH (US); Karsten Bueker, Dortmund (DE); Nicolai Antweiler, Essen (DE); Andreas Bode, Ludwigshafen (DE)

(73) Assignees: BASF SE, Ludwigshafen am Rhein (DE); thyssenkrupp AG, Essen (DE); thyssenkrupp Uhde GmbH, Dortmund (DE)

( * ) Notice: Subject to any disclaimer, the term of this patent is extended or adjusted under 35 U.S.C. 154(b) by 635 days.

(21) Appl. No.: 17/596,000

(22) PCT Filed: May 28, 2020

(86) PCT No.: PCT/EP2020/064780
§ 371 (c)(1),
(2) Date: Dec. 1, 2021

(87) PCT Pub. No.: WO2020/245017
PCT Pub. Date: Dec. 10, 2020

(65) Prior Publication Data
US 2022/0228280 A1     Jul. 21, 2022

(30) Foreign Application Priority Data
Jun. 5, 2019     (EP) ..................................... 19178445

(51) Int. Cl.
C25C 7/02          (2006.01)
C01B 3/24          (2006.01)
(Continued)

(52) U.S. Cl.
CPC ................ C25C 7/025 (2013.01); C01B 3/24 (2013.01); C01B 32/05 (2017.08); C25C 3/06 (2013.01);
(Continued)

(58) Field of Classification Search
CPC .... C25C 3/06–3/24; C25C 7/025; C01B 3/24; C01B 32/05; C01B 2203/0266; C01B 2203/06
See application file for complete search history.

(56) References Cited

U.S. PATENT DOCUMENTS 2,982,622 A  *  5/1961  Silveston ................ C10B 55/10
                                                      208/126
3,284,334 A      11/1966  Joseph et al.
(Continued)

FOREIGN PATENT DOCUMENTS

AU          608988       *  4/1990
CN       101249949 A       8/2008
(Continued)

OTHER PUBLICATIONS

European Search Report for EP Patent Application No. 19178445.3, Issued on Dec. 17. 2019, 3 pages.
(Continued)

*Primary Examiner* — Ciel P Contreras
(74) *Attorney, Agent, or Firm* — Grüneberg Global IP, PLLC

(57)          ABSTRACT

An integrated process contains the following steps of: (i) pyrolysis of hydrocarbons to carbon and hydrogen, (iia) removal of at least a part of the produced carbon in step (i)
(Continued)

and at least partly further processing of said carbon into a carbon containing electrode, and (iib) removal of the hydrogen produced in step (i) and at least partly using said hydrogen for providing energy, preferably electric energy or heat, for the electrode production in step (iia). A joint plant is also useful, which contains (a) at least one reactor for a pyrolysis process, (b) at least one reactor for the production of electrodes for an aluminum process, (c) a power plant and/or at least one gas-fired burner, and optionally, (d) at least one reactor for the electrolysis for producing aluminum.

18 Claims, 1 Drawing Sheet

(51) Int. Cl.
   *C01B 32/05*       (2017.01)
   *C25C 3/06*        (2006.01)
   *C25C 3/12*        (2006.01)
(52) U.S. Cl.
   CPC ...... *C25C 3/125* (2013.01); *C01B 2203/0266*
   (2013.01); *C01B 2203/06* (2013.01)

(56)                References Cited

U.S. PATENT DOCUMENTS

| | | | | |
|---|---|---|---|---|
| 3,427,240 | A | | 2/1969 | Landrum et al. |
| 3,442,787 | A | | 5/1969 | Landrum et al. |
| 4,775,455 | A | * | 10/1988 | Chandramouli ...... C04B 35/532 |
| | | | | 264/105 |
| 4,943,367 | A | * | 7/1990 | Nixon ..................... C25C 3/125 |
| | | | | 201/24 |
| 5,139,002 | A | * | 8/1992 | Lynch ..................... F02B 43/10 |
| | | | | 123/DIG. 12 |
| 6,723,212 | B1 | * | 4/2004 | Paulus ...................... C25C 3/08 |
| | | | | 204/243.1 |
| 9,359,200 | B2 | | 6/2016 | Maass et al. |
| 9,938,144 | B2 | | 4/2018 | Maass et al. |
| 10,351,422 | B2 | | 7/2019 | Machhammer et al. |
| 2002/0007594 | A1 | | 1/2002 | Muradov |
| 2015/0018548 | A1 | * | 1/2015 | Shi ........................ C07C 209/48 |
| | | | | 546/184 |
| 2021/0051770 | A1 | | 2/2021 | Appel et al. |
| 2021/0061654 | A1 | * | 3/2021 | McFarland .............. B01J 27/08 |

FOREIGN PATENT DOCUMENTS

| | | | |
|---|---|---|---|
| DE | 1266273 | B | 4/1968 |
| EP | 2987769 | A1 | 2/2016 |
| WO | WO-2010/127961 | A1 | 11/2010 |
| WO | WO-2013/004398 | A2 | 1/2013 |
| WO | WO-2014/090914 | A1 | 6/2014 |
| WO | WO-2019/145279 | A1 | 8/2019 |
| WO | WO-2020/016186 | A1 | 1/2020 |

OTHER PUBLICATIONS

International Search Report for PCT Patent Application No. PCT/EP2020/064780, Issued on Jul. 21, 2020, 3 pages.
Kvande, et al., "Chapter 7: Operation of Alumina Reduction Cells", Introduction to Aluminium Electrolysis Understanding the Hall Héroult Process, ed. Grjotheim, et al., 2nd Edition, 1993, pp. 199-217.
Maughan, et al., "Reducing Gas Turbine Emissions through Hydrogen-Enhanced Steam-Injected Combustion," Proceedings of ASME Cogen-Turbo Conference, Oct. 25-27, 1994, pp. 381-390.
Nazim Muradov, "Low to near-zero CO2 production of hydrogen from fossil fuels: Status and perspectives", International Journal of Hydrogen Energy, vol. 42, Issue 20, May 18, 2017, pp. 14058-14088.
Written Opinion for PCT Patent Application No. PCT/EP2020/064780, issued on Jul. 21, 2020, 5 pages.
Heinrich Predel, "Petroleum Coke", Ullmann'S Encyclopedia of Industrial Chemistry, 2014, pp. 1-21.

* cited by examiner

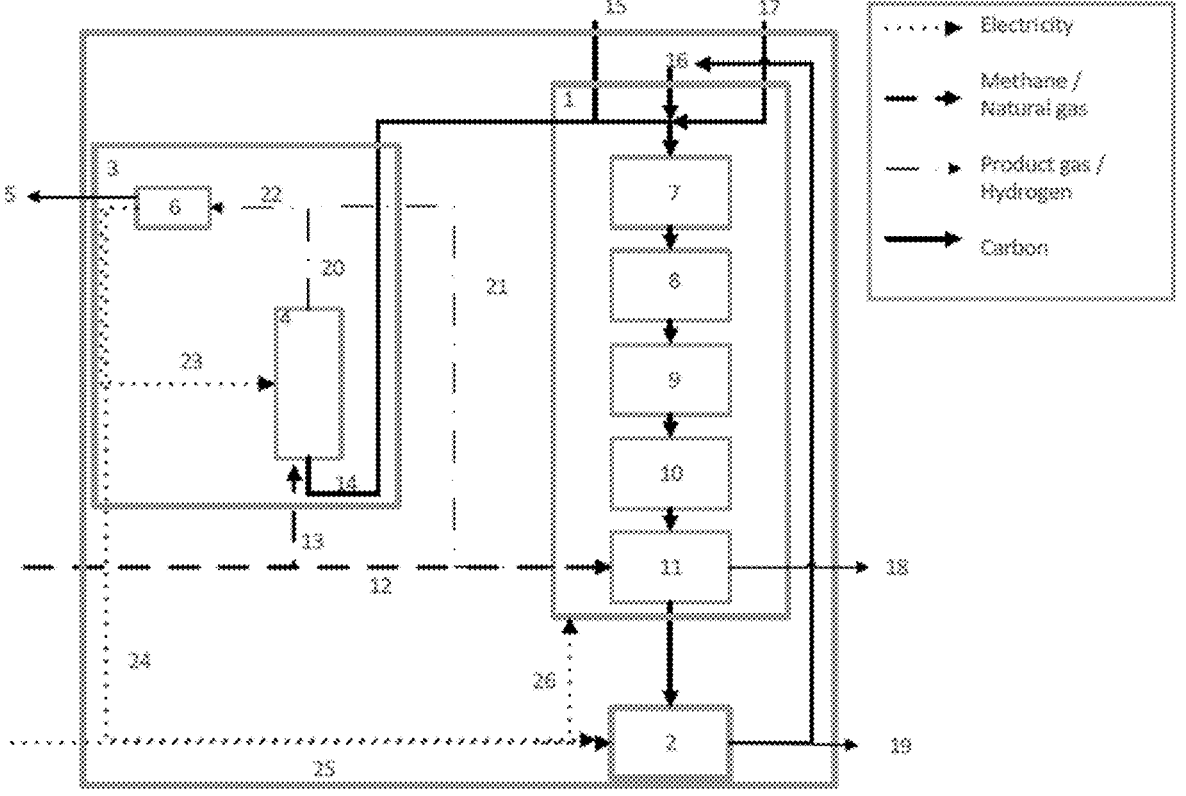

INTEGRATED PROCESS OF PYROLYSIS, ELECTRODE ANODE PRODUCTION AND ALUMINUM PRODUCTION AND JOINT PLANT

CROSS-REFERENCE TO RELATED APPLICATIONS

This application is the National Stage entry under § 371 of International Application No. PCT/EP2020/064780, filed on May 28, 2020, and which claims the benefit of priority to European Application No. 19178445.3, filed on Jun. 5, 2019. The content of each of these applications is hereby incorporated by reference in its entirety.

BACKGROUND OF THE INVENTION

Field of the Invention

The present invention relates to an integrated process containing the following steps (i) pyrolysis of hydrocarbons to carbon and hydrogen, (iia) removal of at least a part of the produced carbon in step (i) and at least partly further processing of said carbon into a carbon containing electrode, (iib) removal of the hydrogen produced in step (i) and at least partly use said hydrogen for providing energy, preferably electric energy or heat, for the electrode production in step (iia). In addition, the present invention relates to a joint plant containing (a) at least one reactor for a pyrolysis process, (b) at least one reactor for production of electrodes for an aluminum process, (c) a power plant and/or at least one gas-fired burner and optionally (d) at least one reactor for the electrolysis for producing aluminum.

Description of Related Art

Reduction of CO2-emissions is an on-going task for any country in the world. Important sources of CO2 emissions are not only power generation, but also the manufacture of our everyday consumer goods; among these the use of energy-intensive materials such as aluminum. Whether beverage cans, packaging, New Year's Eve rockets, toothpaste, car parts, machine parts, airplanes or even food—aluminum is contained everywhere.

The production of aluminium is carried out in electrolytic cells or pots (known as Hall-Hé-roult process). Electrolysis of Al2O3 occurs in a molten bath of cryolite (Na3AlF6) layered between the carbon anodes and the molten metal. Aluminium ions within Al2O3 are reduced to form molten aluminium. The molten aluminium is collected at the bottom of the cell.

Smelters have high power demand, the energy costs account for nearly 40% of the total aluminum cost. Aluminum oxide is chemically very stable and requires a large amount of electrical energy to reduce, also to keep the cryolite molten, heated by electrical heating from resistance across the cell, which combined have very high electricity consumption—on the order of 13-14 kWh/kg Al. Energy is also required to preheat the electrodes before putting into service, which is done using electrical resistance or preheating with a gas burner.

Additionally, inconsistent power disrupts production and constant power is required to keep the process molten, blackouts can cause significant downtime. In reverse, potline trips may also cause sudden drops in demand from power companies which the power supplier must be able to cope with.

For this reason, aluminum plants benefit from large scale, and are often located near sources of cheap and available electric power or even employ their own power generation plants (captive power plants from nuclear, hydrothermal, or coal). For example, the new Emirate Aluminum plant in Al Taweelah has a connected 3000 MW natural gas burning power plant supplying power for just the smelting operations, and Santiago Hydroelectric project aims to build an aluminum smelter run directly from its own hydroelectric power source.

The needed carbon electrodes for the aluminum production may be Soderberg anodes, a continuous self-baking type, or much more commonly pre-baked, which are made in-house and periodically exchanged in the smelting cells as they are consumed.

For the production of the prebaked anodes, calcined coke, a byproduct from petrochemical refining (petcoke) is crushed and blended with material from spent electrodes (butts), mixed with pitch and formed into green anodes, then baked in large gas-fired furnaces at 1000-1250 C. Reclaimed material from the butts can make up 15-25% of the total cell and represents significant cost and waste reduction.

In the aluminum production from Al2O3, the carbon anode serves as a reducing agent in the electrolysis process according to the following scheme, with stoichiometrically 334 kg of carbon being required per tonne of raw aluminum, but actually about 400 kgC/tAl are required by carbon deposition:

$$2Al2O3 \rightarrow +3C \rightarrow 4Al+3CO2$$

Various reactions in the cell contribute to the consumption of the anode carbon. Those that do not result in metal reduction contribute to excess carbon consumption like airburn (O2+ C→CO2, with O2 from ambient air), carboxy attack (CO2+ C→CO, with CO2 as product of the Aluminium-producing redox reaction) and selective oxidation (dusting). Dusting occurs as a secondary effect of CO2 attack due to reactivity imbalance between the different coke phases allowing fragments of solid C to fall out.

In this process, the carbon impurities, which consist mainly of metallic trace elements and up to 3% by weight of sulfur, result in either faster burnup of the electrodes, contamination of the aluminum or SO2 emissions.

The cost of carbon anode accounts for 15-20% of the total cost of aluminum electrolysis production. Hence, the quality of the carbon anode is of crucial importance and significantly influences the energy consumption and environmental effects of aluminum electrolysis.

The needed petcoke is purchased, usually after calcination directly from refineries. Because of the size and high throughput of anodes and need to recycle a significant fraction of butts, smelters maintain the anode production and baking in-house, with dedicated equipment and cranes etc for moving the large anodes between forming, baking and smelting steps. Keeping the baking in-house also allows smelters to maintain control of the baking conditions, which affect cell performance.

The anode production for the aluminum process is described for example in "Anode Manufacture, Raw Materials Formulation and Processing Parameters" by Kristine L. Hulse, R&D Carbon.

The continued increase of the demand for aluminium metal combined with the decrease and fluctuations in the quality of aluminium grade coke with both the density and the purity of the cokes affected makes it more challenging for the anode manufacturing plants to deliver steady quality anodes. The low-quality grade coke has higher reactivity resulting in higher carbon consumption in the smelter.

Approximately 95% of the SO2 emissions generated by a smelter can be attributed to sulfur found in the incoming petroleum coke used in anode production. Thus, environmental regulations are aiming at reducing sulfur emissions, while the coke suppliers are offering higher sulfur material. The low sulfur coke material is becoming less available on the market and the price is steadily increasing. In addition, the sulfur level of many traditional "high sulfur" anode grade green cokes is increasing. Five years ago, a high sulfur anode grade green coke was regarded as one with a sulfur level of 3-4%. Today, a more typical level is 4-6%.

The difference in price between a barrel of low sulfur sweet crude oil and high sulfur sour crude, the "sweet-sour spread", is causing more refineries to process cheaper, higher sulfur crude oil. These higher sulfur crudes produce cokes with higher sulfur and metal impurity levels (particularly vanadium and nickel). Calciners are using more of these cokes to satisfy the increasing demand from the aluminum industry.

As the aluminum smelters have not changed coke sulfur specifications significantly due to the smelter environmental constraints the high coke sulfur levels must be offset by blending with lower sulfur cokes. As a result, the difference in sulfur level of cokes used in typical anode blends is increasing—where cokes with a sulfur level of 1-2% may be blended with cokes with sulfur levels up to 4-6% to achieve a smelter anode coke specification of 1.0-3.5%.

With the growth rates projected in primary aluminum production, the industry will have no other choice than using these higher sulfur blend cokes. The sulfur level of high sulfur cokes used in blends is increasing and will likely continue to increase.

Beside the requirements on sulfur, the primary aluminum industry is faced with the task of reducing the CO2 emission.

The use of pyrolysis of hydrocarbons to carbon and hydrogen is already disclosed as a possibility to obtain hydrogen with less or even without CO2 emission; see for example WO 2013/004398. In addition, the pyrolysis is described for example in DE1266273B, US 2002/0007594, WO 2014/090914 and PCT/EP2019/051466. It is described that the produced carbon could be used in the aluminum industry (see EP 18184459.8, filed on Jul. 19, 2018) or for power generation (see EP 2987769) and that the hydrogen could be used in the chemical industry or for any power generation. Up to now, no joint plant concept is disclosed in view of an integrated aluminum production.

If using the pyrolytic hydrogen in the chemical industry, the hydrogen must be purified to >99% and even higher purity is required to use in fuel cell applications. Typically, the pyrolytic hydrogen offgas may only contain 30-90% hydrogen with the remainder mostly unconverted methane. Purification could be done by Pressure Swing Absorption which requires significant construction and operating costs for the pyrolyser.

In a nutshell, the underlying challenges are: (i) ensuring a sufficiently pure carbon source and a stable supply, (ii) reducing CO2 and SO2 emissions during electrode production and the aluminum production process, driven by political incentives for CO2 and SO2 reduction, (iii) ensuring a stable, economical supply of electrical energy, especially in view of an increased proportion of regenerative, fluctuating energy sources.

SUMMARY OF THE INVENTION

The present invention relates to an integrated process containing the following steps: (i) pyrolysis of hydrocarbons to carbon and hydrogen, (iia) removal of at least a part of the produced carbon in step (i) and at least partly further processing of said carbon into a carbon containing electrode and optionally using the produced carbon containing electrode for producing aluminum in step (iii), (iib) removal of the hydrogen produced in step (i) and at least partly use said hydrogen for generation and providing energy, preferably electric energy or heat, for the anode production in step (iia) and/or for the aluminum production in step (iii).

BRIEF DESCRIPTION OF THE DRAWING

The FIGURE shows a sketch of the joint plant.

DETAILED DESCRIPTION OF THE INVENTION

Preferably, the present invention relates to an integrated process containing the following steps: (i) pyrolysis of hydrocarbons to carbon and hydrogen, (iia) removal of at least a part of the produced carbon in step (i) and at least partly further processing of said carbon into a carbon containing electrode, (iii) use of the electrode produced in step (iia) for producing aluminum, especially in a Hall-Heroult-Electrolysis, (iib) removal of the hydrogen produced in step (i) and at least partly use said hydrogen for generation and providing energy, preferably electric energy or heat, for the anode production in step (iia), for the aluminum production in step (iii) and/or for the pyrolysis process in step (i).

The main features of the underlying invention are that both, the produced carbon and the by-product hydrogen, can be used in the electrode and/or aluminum production beneficially. Thus, the underlying invention is a material and energetic integration of the pyrolysis and the electrode and/or aluminum production while solving both the SO2 and CO2 reduction requirements.

The pyrolysis of step (i) can be conducted as described in the literature and known to the skilled person in the art (see for example Muradov, Nazim. "Low to near-zero CO2 production of hydrogen from fossil fuels: Status and perspectives." International Journal of Hydrogen Energy 42.20 (2017): 14058-14088). Typically, gaseous hydrocarbon compounds are decomposed at temperatures ranging from 1000 to 2500 K and at pressures ranging from 0.5-5000 kPa (abs). Typically, a substrate is used; the substrate can either be porous or nonporous and can either be a support substrate in the reactor (a pre-installed part) or a granular and powderish material. The latter can either be realized as fixed bed, moving bed, fluidized bed or entrained flow. The pyrolysis is not limited to a specific energy supply; fossil-fired, electrically heated and/or plasma-driven production reactors are possible.

The substrates are advantageously thermally stable within the range from 500 to 2000° C., preferably 1000 to 1800° C., further preferably 1300 to 1800° C., more preferably 1500 to 1800° C., especially 1600 to 1800° C.

The substrates are advantageously electrically conductive within the range between 10 S/cm and $10^5$ S/cm.

Useful thermally stable substrates advantageously include carbonaceous materials, e.g. coke, silicon carbide and boron carbide. Optionally, the substrates have been coated with catalytic materials. These heat substrate materials may have a different expandability compared with the carbon deposited thereon.

The granule particles have a regular and/or irregular geometric shape. Regular-shaped particles are advantageously spherical or cylindrical.

The granules advantageously have a grain size, i.e. an equivalent diameter determinable by sieving with a particular mesh size, of 0.05 to 100 mm, preferably 0.1 to 50 mm, further preferably 0.2 to 10 mm, especially 0.5 to 5 mm.

Also advantageous is the use of carbonaceous material, for example in granular form. A carbonaceous granular material in the present invention is understood to mean a material that advantageously consists of solid grains having at least 50% by weight, preferably at least 80% by weight, further preferably at least 90% by weight, of carbon, especially at least 90% by weight of carbon.

It is possible to use a multitude of different carbonaceous granular materials in the process of the invention. A granular material of this kind may, for example, consist predominantly of charcoal, coke, coke breeze and/or mixtures thereof. In addition, the carbonaceous granular material may comprise 0% to 15% by weight, based on the total mass of the granular material, preferably 0% to 5% by weight, of metal, metal oxide and/or ceramic.

The word "pyrolytic carbon" covers solid carbon produced from pyrolysis of light hydrocarbons in absence of oxygen. The preferred pyrolytic carbon for electrodes, preferably anode, is a high density solid elemental carbon produced by deposition on carbon granules. This is preferred to thermal black produced by thermal/plasma processes or nanostructured carbon grown on metal/oxide catalysts.

A wide range of microstructures, e.g. isotropic, lamellar, substrate-nucleated and a varied content of remaining hydrogen, can occur in pyrolytic carbons, depending on the deposition conditions (temperature, type, concentration and flow rate of the source gas, surface area of the underlying substrate, etc.).

Typically, the density of the pyrolytic carbon is in the range of 1.6 to 2.3 g/cc, preferably 1.8 to 2.2 (real density in xylene, ISO 8004).

Typically, the impurities of the pyrolytic carbon are: S in the range of 0 to 1%, preferably 0 to 0.5%, more preferable 0 to 0.1%. Fe in the range of 0 to 1000 ppm, preferably 0 to 500 ppm, Ni in the range of 0 to 250 ppm, preferably 0 to 100 ppm, V in the range of 0 to 450 ppm, preferably 0 to 250 ppm, more preferable 0 to 100 ppm. Na in the range of 0 to 200 ppm, preferably 0 to 100 ppm.

Typically, the particle size of the pyrolytic carbon after pyrolysis has at least 5% by weight>1 mm, preferably 50% by weight>0.5 mm.

Typically, the crystal size (XRD) of the pyrolytic carbon is in the range of 20 to 60 Å, preferably 30 to 50 Å, (XRD, ISO 20203) Typically, the porosity of the pyrolytic carbon granule is under 15%, preferably <10%, most preferably below 5% (Hg porosimetry, DIN66133).

Typically, the specific surface area of the pyrolytic carbon measured by Hg porosimetry (DIN66133) is in the range of 0.001 to 5 m2/g, preferably 0.01 to 2 m2/g.

In step (iia) at least a part of the produced pyrolytic carbon in step (i) is removed from the pyrolysis reactor. The removed carbon is at least partly further processed into a carbon containing electrode, preferably anode. The process of producing an electrode, preferably anodes for the aluminum production, is well known in the art (see for example "Anode Manufacture, Raw Materials Formulation and Processing Parameters, Kristine L. Hulse, R&D Carbon"). The use of pyrolytic carbon as blend material in anodes is described in the EP patent application EP 18184459.8, filed on Jul. 19, 2018.

Typically, 35 to 95 weight-% of the total weight of the anode recipe is a blend composition of carbon material, especially petroleum cokes, preferably 50 to 80 weight-%. Typically, 0 to 40 weight-% of the total weight of the anode recipe are butts and/or scraps, preferably 15 to 30 weight-%. Typically, 5 to 25 weight-% of the total weight of the anode recipe is a binder, preferably 10 to 20 weight-%, even more preferably 13 to 18 weight-%.

Preferably the carbon electrode includes a blend composition comprises a mixture whereas (i) the content of petroleum coke is in the range of 30 to 98 weight-%, more preferably in the range 50 to 95 weight-%, more preferably in the range 70 to 95 weight-%, more preferably in the range 85 to 95 weight-%, even more preferably in the range of 90 to 95 weight-% in view of the total weight of the blend composition and (ii) the content of pyrolytic carbon is in the range of 2 to 70 weight-%, more preferably in the range 5 to 50 weight-%, more preferably in the range 5 to 30 weight-%, more preferably in the range 5 to 15 weight-%, even more preferably in the range of 5 to 10 weight-% in view of the total weight of the blend composition.

Preferably, calcined petroleum coke (CPC) is used as petroleum coke (Predel, H. (2000). Petroleum coke. Ullmann's Encyclopedia of Industrial Chemistry). Preferably, the sulfur content of the petroleum coke is in the range of 0 to 10 weight-%, more preferably in the range of 0.5 to 8.5 weight-%, more preferably in the range of 1.5 to 7.0 weight % in view of the total weight of the petroleum coke. Petroleum coke is often abbreviated as petcoke.

Preferably, the blend composition contains as least two particle size fractions (i) granular above 0.5 mm and (ii) fines below 0.5 mm. Typically, the granular size fraction ranges from 0.5 to 16 mm, preferably 0.5 to 8 mm. Typically, the fines size fraction ranges from 0.005 to 0.5 mm.

In view of the total pyrolytic carbon: Preferably 30 to 100 weight-% of the total pyrolytic carbon of the blend composition is in the granular fraction, even more preferably 50 to 100 weight-%, more preferably 70 to 100 weight-%, more preferably 90 to 100 weight-%, even more preferably 95 to 100 weight-%, even more preferably all pyrolytic carbon is in the granular size fraction.

Preferably 30 to 80 weight-%, more preferably 40 to 70 weight-%, even more preferably 50 to 65 weight-% of the particles have a granular particle size, and 20 to 70 weight-%, more preferably 30 to 60 weight-%, even more preferably 35 to 50 weight-% of the particles have a fine particle size.

The pyrolytic carbon could be added to the petroleum coke either before crushing, screening and sizing the fractions or by adding the pyrolytic carbon directly in the already crushed, screened and sized aggregate of petroleum coke. Preferably, the pyrolytic carbon can be added directly into the existing anode raw material streams.

The blend composition of pyrolytic carbon and petroleum coke and the butts and/or scraps are preferably preheated, preferably to a temperature (to melt the binder) of 100 and 175° C., and mixed with binder, typically coal tar pitch, that has preferably also been preheated to melt. The preheated anode recipe is preferably pressed to the final shape, ensuring the compacted anode block maintains its structural form. The green compact is preferably subsequently heated at an elevated temperature, for example 1000 to 1250° C., to form a baked anode before it is suitable for consumption in the electrolysis cell.

Preferably, the carbon anode produced according to this invention provides one or more of the following performance properties, preferably all mentioned parameters:

The green density is preferably at least as high as 1.50 g/cm3. Established ranges for CPC anodes are 1.54 to 1.66 g/cm3 (ISO 12985-1).

The baked density is preferably at least as high as 1.50 g/cm3 (ISO 12985-1). The established ranges for CPC anodes are 1.50 to 1.58 g/cm3 (ISO 12985-1).

The thermoshock and mechanical resistance is preferably higher than 6 MPa (ISO 12986-1), whereas 6-11 MPa are typical for CPC-based anodes.

The compressive strength is preferably higher than 25 MPa (ISO 18515).

The electric resistance is preferably below 80 $\mu\Omega$m. 55-80 $\mu\Omega$m is a typical industry range. The so-called air residue after test reaction with air is preferably lower than 85 wt.-%, more preferably 70 wt.-%, in case of air reactivity (70-85 are typical, ISO 12989-1). The so-called CO2 residue after test reaction with CO2 is preferably lower than 95 wt.-%, more preferably 80 wt.-% for the CO2 reactivity (where 80-95 are conventional, ISO 12988-1).

Preferably, 80 to 100 weight-% of the produced carbon in step (i) is further processed into a carbon containing electrode; more preferred 90 to 100 weight-% of the produced carbon in step (i) is further processed into a carbon containing electrode; even more preferred all of the produced carbon in step (i) is further processed into a carbon containing electrode. The capacity of the pyrolysis reaction can easily be adapted to the carbon demand of the electrode production.

Additionally, another part of the removed pyrolytic carbon produced in step (i) could be combusted to heat other parts of the integrated process as gas-fired burners can run on carbon dust.

In addition, another part of the removed pyrolytic carbon could be sold for other applications like the use in steels or for electrode production on another industrial site.

In step (iii) the electrode, preferably anode, produced in step (iia) is used in an aluminum production, especially in a Hall-Heroult-Electrolysis. The Hall-Heroult-Electrolysis is well known in the art (see for example [Grjotheim K, Kvande H, eds. Introduction to Aluminium Electrolysis-Understanding the Hall-Heroult Process. 2nd ed. Dussel-dorf, Germany: Aluminium-Verlag; 1993:199-217.]).

In step (iib) the hydrogen produced in step (i) is removed from the pyrolysis reactor. At least a part of said hydrogen is used for the generation of energy, preferably for the generation of electric energy or heat both well known in the state of the art. The generated energy is provided for the electrode production in step (iia), for the aluminum production in step (iii) and/or for the pyrolysis process in step (i).

The regulation whether hydrogen is used to generate heat or electric power may be subject to the availability of external regenerative excess electricity capacities (see for example WO 2014/090914). In addition, the regulation whether hydrogen is used to generate heat or electric power depends on the energy portfolio of the smelter, the aluminum production.

The hydrogen generated in step (i) can preferably be used as fuel or as a blend to the traditional fuel, mainly natural gas, for any heating step in the process of aluminum production, electrode production and/or in the pyrolysis process. Preferably, at least a part of the hydrogen produced in step (i) is used to enrich natural gas in burners for heating the electrode production in step (iia).

Preferably 5 to 50 volume %, even more preferably 10 to 40%, even more preferably 20 to 30% of the natural gas, used as fuel, can be replaced by the hydrogen produced in step (i).

Preferably up to 30% by volume of natural gas can be replaced with hydrogen produced in step (i). Typically, the existing burner does not need to be modified. Hydrogen can improve the combustion and reduce the emissions if blended into existing natural gas burners. A replacing of 30% of natural gas with hydrogen in power generators or gas-fired burned would already cut CO2 emissions by up to 18%. Natural gas, enriched with hydrogen, is already used in Germany and the Netherlands. Maughan et al. discloses that natural gas with 10-20 volume percent H2 will also have lower NOx emissions (Maughan, J. R., J. H. Bowen, D. H. Cooke and J. J. Tuzson, "Reducing Gas Turbine Emissions through Hydrogen-Enhanced, Steam-Injected Combustion," Proceedings of ASME Cogen-Turbo Conference, pp. 381-390, 1994).

The fuel enriched with hydrogen is preferably used for the burners in the baking step of the electrode in step (iia) and/or the electrode pre-heating in step (iii). The modification of existing burners based on natural gas to a fuel based on hydrogen and/or natural gas is known in the art.

Alternatively, a part of the hydrogen produced in step (i) is used to heat the pyrolysis; either as fuel for a burner or via generating electricity.

Alternatively, a part of the hydrogen produced in step (i) is used for generating electricity to heat smelting cells of the aluminum production (iii).

In addition, a part of the hydrogen produced in step (i) is used for generating electricity to heat the baking step of the electrode in step (iia). The common known facilities for preheating and baking the electrode can easily be adapted to be heated by electricity.

The hydrogen produced in step (i), that means the pyro-lytic hydrogen offgas, contains about 30 to 90 volume % hydrogen and the remainder mostly unconverted methane. If this pyrolytic hydrogen offgas is used to blend natural gas in a burner system, such as for power generation or in gas-fired burners, it would not be required to remove the excess methane from the hydrogen and still provides the benefits to CO2 reduction of hydrogen-enriched natural gas.

Preferably, the hydrogen produced in step (i) is used to blend natural gas in a burner system without any purifica-tion.

In addition, part of the hydrogen produced in step (i) could be exported, for example to a neighboring industrial plant or site like a site manufacturing iron, especially for the direct reduction of iron ore, or for other chemical processes needing hydrogen as a reducing agent.

In addition, part of the hydrogen produced in step (i) could be fed into the national gas grid.

The three plants can be easily connected by a skilled person in the art. Preferably, the pyrolytic carbon can be added directly into the existing electrode, preferably anode, raw material streams. Preferably the hydrogen produced in step (i) can be easily blended with the natural gas lines.

In addition, the present invention relates to a joint plant containing (a) a reactor for a pyrolysis process, (b) a reactor for production of electrodes, preferably anodes, for an aluminum process, (c) a power plant and/or at least one gas-fired burner and optionally (d) a reactor for the elec-trolysis for producing aluminum.

Preferably, a power plant is integrated in the joint plant. The power plant for electricity generation is preferably a gas turbine, a boiler or a hydrogen fuel cell. The turbine and/or boiler can preferably be used without any treatment and/or separation of the feed gas.

The benefit of the joint plan still exists if the plants are located in a radius about 50 to 100 km.

Advantage:

An advantage of this process is that methane (natural gas) is a carbon source that can more easily be transported than petcoke. Nature gas can be transported by pipeline, readily available in locations where petcoke may not be. Petcoke is supplied primarily from refineries and shipped by boats to smelters located near cheap electric power such as from hydroelectricity that may not be near sea ports.

An additional advantage is that the pyrolysis coke is very clean and that the integrated pyrolysis process results in a constant carbon supply. The carbon does not suffer from fluctuations in cost, purity and properties which are experienced in the petcoke market. This stability has significant operational benefit for smelters.

In addition, smelters produce a lot of CO2 by their process and will benefit from reducing emissions, H2 could be used for the baking instead of traditional gas-fired burners. Hydrogen could also be used for CO2-free power generation.

For example, Australia gives smelters cheaper power if they're using higher % renewables energy ("Energy efficiency best practice in the Australian aluminum industry", Department of Industry, Science and Resources—Australian Government. July 2000).

As smelters already blend in a portion of butts, smelters are already able to handle mixed streams, internal and external carbon supply.

In addition, when generating H2 from pyrolysis, the hydrogen must be purified to >99 volume % for use in chemical processes, and even higher purity is required to use in fuel cell applications. Typically, the offgas may only be 30-90% hydrogen with the remainder mostly unconverted methane. Purification is done typically by Pressure Swing Absorption which requires significant construction and operating costs for the pyrolyser. Instead, using the offgas from pyrolysis blended into natural gas in a burner system, such as for power generation or in gas-fired burners, would not require removal of excess methane from the hydrogen and still provides the benefits to CO2 reduction of Hydrogen-enriched natural gas.

In summary, the present inventions offers the following economic and technological advantages: (i) integrated production and use of pyrolysis carbon for electrode production with potentially advantageous properties in aluminum production, e.g. lower electricity and carbon consumption and a reduction in CO2 and SO2 emissions; (ii) lower petroleum coke requirement and increased tolerance of lower grade petcoke; (iii) integrated supply and use of electrical energy and thus reduction of electricity costs; (iv) integrated use of hydrogen by firing and thus reduction of methane/natural gas combustion and CO2 emissions; (v) no third party, e.g. customers for co-products such as synthesis gas, required.

In view of (v), the integration within the joint plant is completed and no additional coupling or decoupling of material and energy flows is required. That means, that the integration of a pyrolysis in the electrode production is not dependent on the demand of any co-product streams by third parties.

The FIGURE shows the sketch of the joint plant:

[1] is the anode baking step, [2] is the Hall-Herout smelting process, [3] is the combined methane pyrolysis and power generation plant, [4] is the methane pyrolysis reactor, [5] is the offgas from power turbine, [6] is a combined cycle natural gas/H2 turbine, [7-11] are the steps in anode manufacture/baking where [7] is heating, [8] mixing, [9] forming, [10] green anodes, [11] the anode baking step. [12] is the natural gas from grid for the anode baking step and [13] the natural gas to the pyrolysis reactor. Pyrolitic carbon from the reactor [14] combines with [15] fresh petcoke from refineries and [16] recycled electrode butts. [17] is pitch. [18] is the CO2 and emissions from anode baking step and [19] is the combined emissions including CO2/SO2 from electrolysis. [20] H2-rich product gas from pyrolysis reactor which [21] is added to the natural gas to anode baking [12] and the remainder [22] used to generate electrical power. [23] is electrical power used in the pyrolysis and [24] is electrical power to the smelter. [25] is the combined grid and captive generated electricity and [26] is power used in anode manufacture and baking.

EXAMPLES

Example 1

An aluminum smelter which historically averages 1.36 kWh/kg Al product on the anode baking step, supplied by direct combustion of natural gas, replaces 50% of its anode carbon with pyrolytic carbon. This gives direct reduction of 50% of the sulfur emissions from the smelting step. The methane pyrolysis produces an additional 0.07 kg of H2 and requires 0.88 kWh energy to perform the pyrolysis per kg of final Al production. Direct combustion of the Hydrogen byproduct is used to heat the pyrolysis step. Because the byproduct gasses with the hydrogen will be mostly methane, purification is not required if the hydrogen is used in combustion burners. The residual H2 after heating the pyrolysis reactor is used to heat the anode baking step, completely displacing the natural gas demand in baking and resulting in net reduction of 500 kg CDE (Carbon dioxide emissions) per metric ton of Al. The remaining excess 0.12 Nm3 of H2 per kg of Al and can sold or flared or used elsewhere in the system.

Example 2

As in Example 1, an aluminum smelter which historically averages 1.36 kWh/kg Al product on the anode baking step, supplied by direct combustion of natural gas, replaces 50% of its anode carbon with pyrolytic carbon. This gives direct reduction of 50% of the sulfur emissions from the smelting step. The methane pyrolysis produces an additional 0.07 kg of H2 and requires 0.88 kWh energy to perform the pyrolysis per kg of final Al production. Direct combustion of the Hydrogen byproduct is used to heat the pyrolysis step, and residual H2 is blended with natural gas for direct use in existing combined cycle power generation turbines. The resultant power is used to provide electrical power to the smelters. The total generated pyrolysis hydrogen displaces 15% by volume of the total natural gas. Hydrogen enrichment to 30% can be used with little or no modification to existing burners. This results in a direct reduction of 350 kg/metric ton Al CDE (CO2 emissions).

Example 3

As in Example 2, an aluminum smelter which historically averages 1.36 kWh/kg Al product on the anode baking step, supplied by direct combustion of natural gas, replaces 50% of its anode carbon with pyrolytic carbon. This gives direct reduction of 50% of the sulfur emissions from the smelting step. The methane pyrolysis produces an additional 0.07 kg of H2 and requires 0.88 kWh energy to perform the pyrolysis per kg of final Al production. The Hydrogen byproduct is blended with natural gas for direct use in existing combined cycle power generation turbines. The resultant power is used to provide electrical power to the pyrolysis reactor and the smelters. The total generated pyrolysis hydrogen displaces 20% by volume of the total natural gas. This results in a direct reduction of 170 kg/metric ton Al CDE (CO2 emissions).

The invention claimed is:

1. An integrated process, containing the following:

(i) conducting pyrolysis of hydrocarbons in a fixed bed, a moving bed, or a fluidized bed, to produce carbon and hydrogen, wherein a particle size of the carbon produced in (i) has at least 50% by weight greater than 0.5 mm, (iia) removing at least a part of the carbon produced in (i), and at least partly further processing said carbon into a carbon containing anode and using the carbon containing electrode for producing aluminum from $Al_2O_3$ in a Hall-Heroult-Electrolysis (iii), (iib) removing the hydrogen produced in (i) and at least partly using said hydrogen for providing energy for the carbon containing anode production in (iia) and/or for the producing aluminum.

2. The process according to claim 1, wherein at least part of the hydrogen produced in (i) is used to enrich natural gas in burners for providing energy.

3. The process according to claim 1, wherein 5 to 30% of natural gas, used as fuel, is replaced by the hydrogen produced in (i).

4. The process according to claim 1, wherein at least a part of the hydrogen produced in (i) is used for generating electricity to heat the pyrolysis of (i) and/or for smelting cells of the aluminum production.

5. The process according to claim 1, wherein 80 to 100 weight-% of the carbon produced in (i) is further processed into the carbon containing anode.

6. The process according to claim 1, wherein a density of the carbon produced in (i) is in the range of 1.6 to 2.3 g/cc.

7. The process according to claim 1, wherein a part of the hydrogen produced in (i) is exported to neighboring industrial plants for chemical processes needing hydrogen as a reducing agent.

8. The process according to claim 1, comprising using said hydrogen for providing energy for the aluminum production.

9. The process according to claim 1, comprising using the carbon containing anode and the hydrogen for the aluminum production.

10. The process according to claim 1, wherein said hydrocarbons are decomposed at temperatures ranging from 1000 to 2500 K and at pressures ranging from 0.5-5000 kPa using a granular or powderish material as support substrate in (i).

11. The process according to claim 1, wherein granular material is used as support substrate in (i), wherein the granules have a grain size of 0.05 to 100 mm.

12. The process according to claim 1, wherein carbonaceous materials is used as support substrate in (i).

13. The process according to claim 1, wherein coke, silicon carbide, and boron carbide is used as support substrate in (i).

14. The process according to claim 1, wherein the carbon containing anode includes a blend composition of petroleum coke and the carbon produced in (i).

15. The process according to claim 14, wherein the content of petroleum coke is in the range of 30 to 98 weight-% and (ii) the content of the carbon produced in (i) is in the range of 2 to 70 weight-% based on the total weight of the blend composition.

16. The process according to claim 14, wherein the blend composition contains as least two particle size fractions (i) granular above 0.5 mm and (ii) fines below 0.5 mm and wherein 30 to 100 weight-% of the total carbon of the blend composition is in the granular fraction.

17. The process according to claim 1, comprising at least partly using said hydrogen for providing energy for the carbon containing anode production.

18. The process according to claim 1, wherein the crystal size of the carbon is in the range of 20 to 60 A.

* * * * *